United States Patent [19]

Wild

[11] 4,142,934
[45] Mar. 6, 1979

[54] SPACER FOR SUPPORTING FUEL ELEMENT BOXES

[75] Inventor: Eugen Wild, Karlsruhe, Fed. Rep. of Germany

[73] Assignee: Gesellschaft für Kernforschung m.b.H., Karlsruhe, Fed. Rep. of Germany

[21] Appl. No.: 860,469

[22] Filed: Dec. 14, 1977

[30] Foreign Application Priority Data

Dec. 14, 1976 [DE] Fed. Rep. of Germany ....... 2656441

[51] Int. Cl.$^2$ .................................................. G21C 3/02
[52] U.S. Cl. ........................................ 176/78; 176/76; 176/81
[58] Field of Search ............................. 176/76, 78, 81

[56] References Cited

U.S. PATENT DOCUMENTS

| 3,049,485 | 8/1962 | Tatlock et al. | 176/76 X |
| 3,751,335 | 8/1973 | Keith | 176/76 X |
| 3,801,452 | 4/1974 | Milburn | 176/76 X |
| 4,080,253 | 3/1978 | Gesinski | 176/76 X |

Primary Examiner—Peter A. Nelson
Attorney, Agent, or Firm—Spencer & Kaye

[57] ABSTRACT

A spacer plate unit arranged externally on each side and at a predetermined level of a polygonal fuel element box for mutually supporting, with respect to one another, a plurality of the fuel element boxes forming a fuel element bundle, is formed of a first and a second spacer plate part each having the same length and the same width and being constituted of unlike first and second materials, respectively. The first and second spacer plate parts of the several spacer plate units situated at the predetermined level are arranged in an alternating continuous series when viewed in the peripheral direction of the fuel element box, so that any two spacer plate units belonging to face-to-face oriented sides of two adjoining fuel element boxes in the fuel element bundle define interfaces of unlike materials.

8 Claims, 2 Drawing Figures

SPACER FOR SUPPORTING FUEL ELEMENT BOXES

BACKGROUND OF THE INVENTION

This invention relates to a spacer plate for supporting hexagonal fuel element boxes with respect to one another in a sodium-cooled fast breeder nuclear reactor.

Conventionally, several hundred fuel element boxes of hexagonal cross section are clamped together to form a compact bundle in the core of sodium-cooled fast breeder reactors. The clamping is effected generally by means of several clamping rings, for example, of ferritic steel, arranged underneath and above the zone occupied in the boxes by the fuel elements proper. At these two height levels, all the fuel element boxes are in engagement with adjacent ones with the intermediary of spacer plates.

In order to maintain the pulling and pushing forces necessary for replacing the fuel element boxes within permissible limits, a self-welding must not occur at the interfaces of the spacer plates during operation of the reactor. Assuming a radial displacement of one or several fuel elements within the hexagonal box, for example, in the direction of one corner of the fuel element box, due to an outward deformation because of asymmetrical temperature changes, such a displacement causes the box to act as an obtuse wedge. The two fuel element boxes which contact the wedge flanges (that is, which contact those two adjoining sides of a fuel element box which form the wedge), should expediently be capable of executing a reversible yielding displacement. Such a yielding displacement, however, can take place only if the frictional forces at the interfaces of the spacer plates do not exceed a predetermined value. Thus, a self-wedging must not occur in any event. For this purpose, it is known to provide, at different cross-sectional planes of the fuel element bundle, rolling-element bearings (ball bearing, roller bearings or pin bearings) which are arranged between the fuel element boxes for the mutual support thereof. A reduction of friction in this manner, however, involves substantial manufacturing costs. Further, it was found that roller bearings or ball bearings do not function satisfactorily in liquid sodium, since at the contact faces characterizing these bearings excessive pressures are generated and thus a significant wear due to this phenomenon could not be avoided.

Further, spacer plates interposed between fuel element boxes are known whose material has a specific frictional coefficient less than 0.5. These known components are, as planar plates or corner plates made of a homogeneous material, arranged on all six sides of each hexagonal fuel element box and are thus in a mutual contacting relationship. The experimentally determined material for these components has wear and frictional properties which meet the requirements. The cobalt content of this material, however, is so high (65%) that the irradiation of the sodium circuit by the activated wear fragments may pose a real danger. Spacer plate materials which, on the other hand, are free from cobalt or contain only small quantitites thereof, do not have favorable frictional properties if the interfaces are of identical material.

SUMMARY OF THE INVENTION

Based on the above-outlined state of the art, it is an object of the invention to provide a sufficiently elastic spacer plate of the above-outlined type which, compared to the conventional materials used in reactor construction, has improved frictional properties, yet has a low cobalt content.

This object and others to become apparent as the specification progresses, are accomplished by the invention, according to which, briefly stated, the spacer plate unit arranged externally on each side and at a predetermined level of a polygonal fuel element box for mutually supporting, with respect to one another, a plurality of the fuel element boxes forming a fuel element bundle, is formed of a first and a second spacer plate part each having the same length and the same width and being constituted of unlike first and second materials, respectively. The first and second spacer plate parts of the several spacer plate units situated at the predetermined level are arranged in an alternating continuous series when viewed in the peripheral direction of the fuel element box, so that any two spacer plate units belonging to face-to-face oriented sides of two adjoining fuel element boxes in the fuel element bundle define interfaces of unlike materials.

In accordance with a further feature of the invention, one of the materials is a cobalt-containing material, such as Stellite 6 conventionally used for its favorable friction properties, whereas the other material is an alloy conventionally used as building material in reactors (reactor alloy) such as Inconel 718 or Hastelloy.

DESCRIPTION OF THE PREFERRED EMBODIMENT

Figure 1:
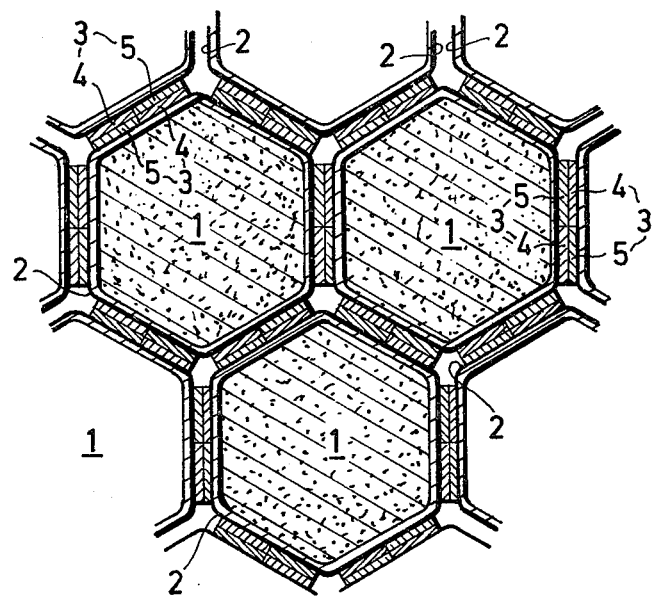
FIG. 1 is a cross-sectional view of a part of a hexagonal fuel element bundle incorporating spacer plate units according to a preferred embodiment of the invention.
Figure 2:
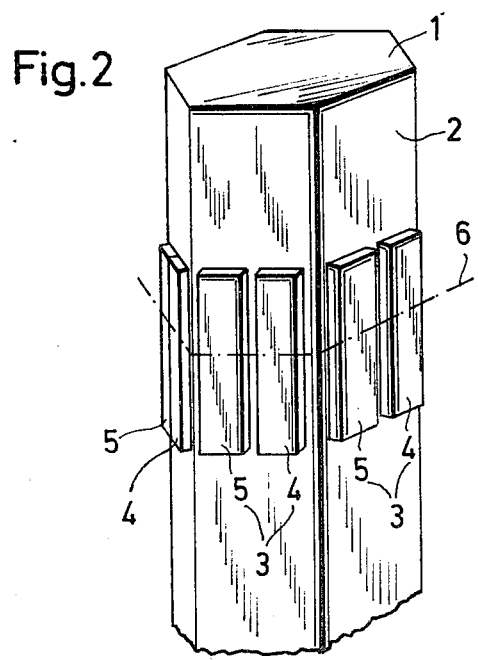
FIG. 2 is a perspective view of a fuel element box carrying spacer plate units according to the invention.

Turning now to the Figures, elongated fuel element boxes 1, each having outer faces 2 and a hexagonal cross section, are arranged into a compact bundle in a parallel, face-to-face relationship as illustrated in FIG. 1. On each outer face 2 of every fuel element box 1, there is arranged a spacer plate unit 3, as shown in FIG. 2. The spacer plate units may also be mounted in an alternating, over-the-corner arrangement. Each spacer plate unit 3 is formed of two spacer plate parts 4 and 5 which are arranged side-by-side (either in a contacting or in a spaced relationship) and which consist of two unlike materials. Based on tests, a material pair according to the invention consisting of Stellite 6 and Inconel 718 or Stellite 6 and Hastelloy has been found to be particularly advantageous. The spacer plate parts 4 and 5 have identical geometrical dimensions; on each outer face 2 of the polygonal fuel element box 1 they assume the same position with respect to the center of the box so that within the hexagonal bundle of the fuel element boxes 1, each spacer plate unit 3 of any fuel element box 1 engages a spacer plate unit 3 of an adjoining fuel element box 1 in such a manner that the spacer plate part 4 (made of the one type of material) of the one spacer plate unit 3 is (as seen in FIG. 1) in a face-to-face contact with the spacer plate part 5 (made of the other type of material) of the other spacer plate unit 3, and conversely. The spacer plate units 3 are arranged expediently at several levels 6 (only one shown in FIG. 2) of each fuel element box 1.

Dimensions of an example:

fuel element box:
 width over flats 110 mm
 edge length 62.5 mm spacer plate 4 or 5:
 length 50 mm
 width 25 mm
 thickness 0.5 mm composition with approximate percentages of the materials

|  | Fe | Cr | Mo | Ni | Ti | W | Co | Nb | C | Si |
|---|---|---|---|---|---|---|---|---|---|---|
| Inconel 7.8 | 19 | 18.5 | 3 | 53.5 | 1 | — | — | 5 | — | — |
| Hastelloy | 6 | 17 | 17 | 55 | — | 5 | — | — | — | — |
| Stellite 6 | 13 | 24 | — | 3 | — | 4.5 | 53.5 | — | 1 | 1 |

The invention is thus based on the recognition that unlike materials which are in a face-to-face engagement have more favorable frictional properties than like materials. This recognition can be best utilized by way of the above-described particular structure of the spacer plates in hexagonal fuel element boxes. The two spacer plate parts made of the two types of material may be combined in a single-piece spacer plate unit, or they may be arranged side-by-side with respect to one another, with or without spacing. In any event, the position of all spacer plate parts on each fuel element box has to be the same, that is, they all have to be symmetrical with respect to the median of the respective outer face of the fuel element box to ensure that cooperating spacer plate units in the fuel element bundle are positively in a face-to-face relationship. Further, viewing a single fuel element box in the peripheral direction, about a full circle, the spacer plate parts 4 and 5 alternate in an endless series. Further, considering any two adjoining fuel boxes, the spacer plate parts 4, on the one hand, and the spacer plate parts 5, on the other hand, are arranged diagonally. This arrangement according to the invention has the further advantage that an insertion of a fuel element box in the incorrect orientation is not possible.

The particular advantage of the invention resides in that by means of the particular arrangement of the spacer plates, the physical criteria in solid bodies for reducing the tendency for cold welding and thus the advantages of pairing unlike materials are rendered effective. Further, the high cobalt content of known spacer plate materials which causes high radiation stresses, can be reduced to at least one-half of the conventional value.

It will be understood that the above description of the present invention is susceptible to various modifications, changes and adaptations, and the same are intended to be comprehended within the meaning and range of equivalents of the appended claims.

What is claimed is:

1. In a spacer plate unit arranged externally on each side and at a predetermined level of a polygonal fuel element box for mutually supporting, with respect to one another, a plurality of the fuel element boxes forming a fuel element bundle, the improvement wherein each said spacer plate unit is formed of juxtapositioned first and second spacer plate parts each having the same length and the same width and being constituted of unlike first and second materials, respectively; said first and second spacer plate parts of the several spacer plate units situated at said level being arranged alternatingly when viewed in the peripheral direction of the fuel element box, whereby any two spacer plate units belonging to face-to-face oriented sides of two adjoining fuel element boxes in the fuel element bundle define interfaces of unlike materials.

2. A spacer plate unit as defined in claim 1, wherein said first and second spacer plate parts of each spacer plate unit are in a side-by-side contacting relationship.

3. A spacer plate unit as defined in claim 1, wherein said first and second spacer plate parts of each spacer plate unit are in a side-by-side spaced relationship.

4. A spacer plate unit as defined in claim 1, wherein said first material is a cobalt-containing alloy and said second material is a reactor alloy.

5. A spacer plate unit as defined in claim 4, wherein said cobalt-containing alloy is Stellite 6.

6. A spacer plate unit as defined in claim 5, wherein said reactor alloy is Inconel 718.

7. A spacer plate unit as defined in claim 5, wherein said reactor alloy is Hastelloy.

8. In a spacer plate unit for supporting hexagonal fuel element boxes in a nuclear reactor, the improvement wherein each spacer plate unit is formed of juxtapositioned first and second spacer plate parts each having the same length and the same width and being constituted of unlike first and second materials, respectively; said first and second spacer plate parts being arranged alternatingly when viewed in the peripheral direction of the fuel element box.

* * * * *